US012684007B2

(12) United States Patent
Anand et al.

(10) Patent No.: US 12,684,007 B2
(45) Date of Patent: **\*Jul. 14, 2026**

(54) COMPUTER-BASED SYSTEMS CONFIGURED FOR NETWORK CHARACTERIZATION AND MANAGEMENT BASED ON DEVICE CRITICALITY SCORE AND METHODS OF USE THEREOF

(71) Applicant: Virtualitics, Inc., Pasadena, CA (US)

(72) Inventors: Vaibhav Anand, Chicago, IL (US); Charles Joseph Bonfield, Raleigh, NC (US); Jae Gook Ro, Chantilly, VA (US); Brandon Lee Knight, South Lake Tahoe, CA (US); Sarthak Sahu, Pasadena, CA (US); Ciro Donalek, Pasadena, CA (US); Michael Amori, Pasadena, CA (US)

(73) Assignee: Virtualitics, Inc., Pasadena, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/205,793

(22) Filed: May 12, 2025

(65) Prior Publication Data

US 2025/0358306 A1     Nov. 20, 2025

Related U.S. Application Data

(63) Continuation of application No. 18/800,553, filed on Aug. 12, 2024, now Pat. No. 12,301,613.

(60) Provisional application No. 63/649,207, filed on May 17, 2024.

(51) Int. Cl.
*H04L 9/40* (2022.01)

(52) U.S. Cl.
CPC ...... *H04L 63/1433* (2013.01); *H04L 63/1408* (2013.01)

(58) Field of Classification Search
CPC ................................................ H04L 63/1433
See application file for complete search history.

(56) References Cited

U.S. PATENT DOCUMENTS

| | | | | |
|---|---|---|---|---|
| 8,332,947 | B1 * | 12/2012 | Bregman ............ | H04L 63/1433 726/25 |
| 8,601,587 | B1 * | 12/2013 | Powell ................. | G06F 21/552 726/25 |
| 9,692,778 | B1 * | 6/2017 | Mohanty ............. | G06F 9/45533 |
| 10,878,102 | B2 * | 12/2020 | Manadhata ......... | G06F 16/9024 |
| 11,140,193 | B2 * | 10/2021 | Patel ..................... | G06F 21/577 |

(Continued)

*Primary Examiner* — Khang Do
(74) *Attorney, Agent, or Firm* — GREENBERG TRAURIG, LLP

(57) ABSTRACT

A method includes scanning a network having a first and second host, obtaining, via the scanning, a first and second type information of the first and second host, respectively, the first or second type information including a device category the first or second host belongs to, obtaining, via the scanning, a first and second scaling factor of the first and second host, respectively, calculating, a first criticality score of the first host based on the first type information and the first scaling factor, calculating a second criticality score of the second host based on the second type information and the second scaling factor, and facilitating to apply a security patch on the first host prior to the second host when the first criticality score is higher than the second criticality score.

18 Claims, 8 Drawing Sheets

600

Scanning a network having at least a first and second host     610

Obtaining, via the scanning, a first and second type information of the first and second host, respectively     620

Obtaining, via the scanning, a first and second scaling factor of the first and second host, respectively     630 calculating a first criticality score of the first host based on the first type information and the first scaling factor;     640

Calculating a second criticality score of the second host based on the second type information and the second scaling factor     650 facilitating to apply a security patch on the first host prior to the second host when the first criticality score is higher than the second criticality score     660

(56) References Cited

U.S. PATENT DOCUMENTS

| | | | | |
|---|---|---|---|---|
| 11,201,891 B2 * | 12/2021 | Davis | G06F 21/554 |
| 11,438,362 B2 * | 9/2022 | Aleidan | H04L 63/1433 |
| 11,463,468 B2 * | 10/2022 | Grounds | G06N 20/00 |
| 11,537,706 B1 * | 12/2022 | Sharifi Mehr | G06F 21/33 |
| 11,563,764 B1 * | 1/2023 | Hoscheit | H04L 63/20 |
| 11,677,773 B2 * | 6/2023 | Iyer | H04L 63/164 |
| | | | 726/25 |
| 11,716,346 B1 * | 8/2023 | Kraemer | H04L 63/20 |
| 11,995,593 B2 * | 5/2024 | Risoldi | G06F 21/554 |
| 12,056,707 B2 * | 8/2024 | Muthuswamy | G06Q 30/0185 |
| 12,124,582 B2 * | 10/2024 | Gourisetti | G06F 21/577 |
| 12,301,613 B1 * | 5/2025 | Anand | H04L 63/1408 |
| 12,526,303 B2 * | 1/2026 | Dunn | G06F 21/577 |
| 2015/0326601 A1 * | 11/2015 | Grondin | H04L 63/1433 |
| | | | 726/25 |
| 2017/0244740 A1 * | 8/2017 | Mahabir | H04L 63/1433 |
| 2018/0351987 A1 * | 12/2018 | Patel | G06F 21/577 |
| 2020/0162497 A1 * | 5/2020 | Iyer | H04L 63/164 |
| 2020/0322369 A1 * | 10/2020 | Raghuramu | H04W 12/12 |
| 2021/0218765 A1 * | 7/2021 | Rodriguez Bravo | |
| | | | H04L 63/1433 |
| 2021/0266340 A1 * | 8/2021 | Grounds | H04L 63/1433 |
| 2022/0038471 A1 * | 2/2022 | Sugarbaker | H04L 63/105 |
| 2022/0382881 A1 * | 12/2022 | Zettel | G06F 21/577 |
| 2023/0072859 A1 * | 3/2023 | Sugarbaker | G06F 21/552 |
| 2023/0336581 A1 * | 10/2023 | Dunn | G06F 21/577 |
| 2023/0412630 A1 * | 12/2023 | Revankar | H04L 63/1433 |
| 2024/0031391 A1 * | 1/2024 | Baikalov | H04L 63/1425 |
| 2024/0086555 A1 * | 3/2024 | Gulati | G06F 21/31 |
| 2025/0097227 A1 * | 3/2025 | Grzonkowski | H04L 63/1433 |
| 2025/0358306 A1 * | 11/2025 | Anand | H04L 63/1433 |

* cited by examiner

Colors denote host types (e.g., workstation, server, router).

Critical Hosts

| Host ID | Host Type | Host Type Confidence | Host Criticality Score | Host Risk Score |
|---------|-----------|----------------------|------------------------|-----------------|
| A | Server | 100 | 97 | 39 |
| B | Server | 95 | 95 | 84 |
| C | Server | 100 | 94 | 98 |
| D | Workstation | 96 | 89 | 53 |
| E | Server | 92 | 87 | 85 |
| F | Workstation | 88 | 82 | 92 |
| G | Workstation | 100 | 80 | 64 |

Rows per page: 10    ▾    1-10 of 150

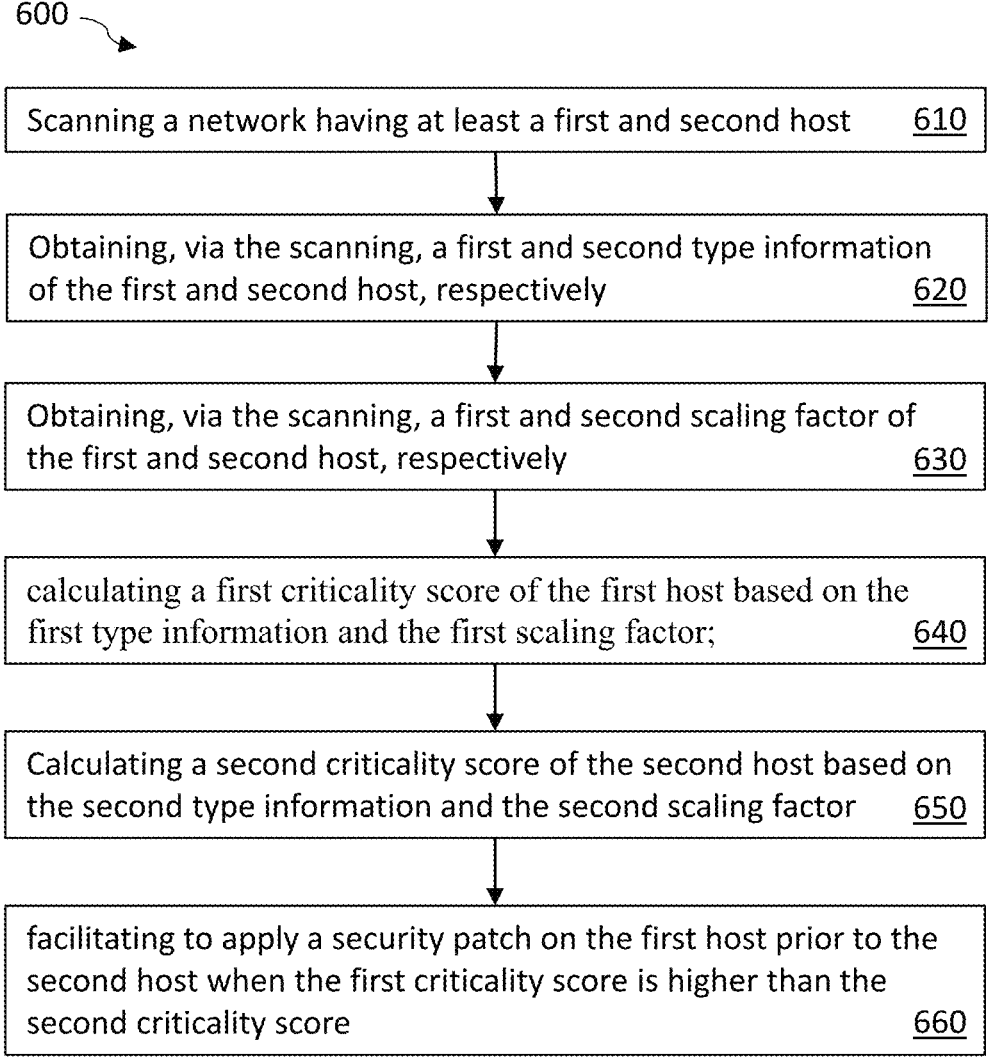

Scanning a network having at least a first and second host    610

Obtaining, via the scanning, a first and second type information of the first and second host, respectively    620

Obtaining, via the scanning, a first and second scaling factor of the first and second host, respectively    630 calculating a first criticality score of the first host based on the first type information and the first scaling factor;    640

Calculating a second criticality score of the second host based on the second type information and the second scaling factor    650 facilitating to apply a security patch on the first host prior to the second host when the first criticality score is higher than the second criticality score    660

FIG. 6

COMPUTER-BASED SYSTEMS CONFIGURED FOR NETWORK CHARACTERIZATION AND MANAGEMENT BASED ON DEVICE CRITICALITY SCORE AND METHODS OF USE THEREOF

CROSS REFERENCE TO RELATED APPLICATION

This application is a continuation of U.S. patent application Ser. No. 18/800,553, filed Aug. 12, 2024, entitled "COMPUTER-BASED SYSTEMS CONFIGURED FOR NETWORK CHARACTERIZATION AND MANAGEMENT BASED ON AUTOMATED KEY TERRAIN IDENTIFICATION AND METHODS OF USE THEREOF," which claims the benefit or priority to U.S. Provisional Application No. 63/649,207, filed May 17, 2024, entitled "COMPUTER-BASED SYSTEMS CONFIGURED FOR NETWORK CHARACTERIZATION AND MANAGEMENT BASED ON AUTOMATED KEY TERRAIN IDENTIFICATION AND METHODS OF USE THEREOF", the specification and drawings of which are incorporated herein by reference.

FIELD OF TECHNOLOGY

The present disclosure generally relates to computer network management, and more particularly to computer network characterization and management based on key terrain identification and methods of use thereof.

BACKGROUND OF TECHNOLOGY

Typically, network security may be viewed as the process of safeguarding the underlying networking infrastructure from unauthorized access, misuse, and/or theft. Typically, network security may involve creating a secure environment for devices, applications, users, and/or data to operate safely. In some embodiments, some aspects of network security may include the use of firewalls, intrusion prevention systems (IPS), workload security, network segmentation and/or virtual private networks (VPN).

Firewalls may be network security devices that monitor incoming and outgoing traffic, deciding whether to allow and/or block specific data based on predefined security rules.

IPS may be configured to actively scan network traffic to block attacks. By correlating global threat intelligence, secure IPS appliances may not only prevent malicious activity but may also track suspect files and malware across the network to prevent further spread.

Workload security may protect workloads moving across different cloud and hybrid environments. Workload security ensures security without compromising business agility.

Software-defined network segmentation classifies network traffic based on endpoint identity (not just IP addresses). Access rights may be assigned by role, location, and other factors, ensuring the right level of access for authorized users and the containment of suspicious devices.

VPNs may encrypt connections from endpoints to networks, often over the internet, enhancing privacy and security.

SUMMARY OF DESCRIBED SUBJECT MATTER

In some aspects, the techniques described herein relate to a computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score of the first host based on the first type information and the first scaling factor; calculating, by the computing device, a second criticality score of the second host based on the second type information and the second scaling factor; and facilitating, by the computing device, to apply a security patch on the first host prior to the second host when the first criticality score is higher than the second criticality score.

In some aspects, the techniques described herein relate to a method, where the first or second device category is one of workstation, router, server, printer, camera or a combination thereof.

In some aspects, the techniques described herein relate to a method, where the first or second type information include a criticality range with a minimum and maximum value for each device category.

In some aspects, the techniques described herein relate to a method, where the minimum value for the device category of the first or second host is determined by a machine learning model.

In some aspects, the techniques described herein relate to a method, where the first criticality score is a product of multiplying the first type information and the first scaling factor, and the second criticality score is a product of multiplying the second type information and the second scaling factor.

In some aspects, the techniques described herein relate to a method, where calculating the first or second criticality score includes using, as a multiplication factor, the minimum value for the device category of the first or second type information.

In some aspects, the techniques described herein relate to a method, where the functionality of the first or second host is identified based on a network map.

In some aspects, the techniques described herein relate to a method, where the functionality of the first or second host is inferred by network traffic and interactions.

In some aspects, the techniques described herein relate to a method, where the use case of the first or second host is determined by a location of the respective host.

In some aspects, the techniques described herein relate to a method, where the network scanning and calculating the criticality scores are conducted repeatedly at a predetermined frequency.

In some aspects, the techniques described herein relate to a computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score of the first host by multiplying the first type information and the first scaling factor; calculating, by the computing device, a second criticality score of the second host by multiplying the second type information and the second scaling factor; and facilitating, by the computing device, to apply a security patch on the first host prior to the second host when the first criticality score is higher than the second criticality score.

In some aspects, the techniques described herein relate to a method, where the first or second device category is one of workstation, router, server, printer, camera or a combination thereof.

In some aspects, the techniques described herein relate to a method, where the first or second type information include a criticality range with a minimum and maximum value for each device category.

In some aspects, the techniques described herein relate to a method, where the minimum value for the device category of the first or second host is determined by a machine learning model.

In some aspects, the techniques described herein relate to a method, where calculating the first or second criticality score includes using, as a multiplication factor, the minimum value for the device category of the first or second type information.

In some aspects, the techniques described herein relate to a method, where the functionality of the first or second host is identified based on a network map.

In some aspects, the techniques described herein relate to a method, where the functionality of the first or second host is inferred by network traffic and interactions.

In some aspects, the techniques described herein relate to a method, where the use case of the first or second host is determined by a location of the first or second host.

In some aspects, the techniques described herein relate to a method, where the network scanning and calculating the criticality scores are conducted repeatedly at a predetermined frequency.

In some aspects, the techniques described herein relate to a system, including: one or more processors; and a memory in communication with the one or more processors and storing instructions that, when executed by the one or more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first and second scaling factor of the first and second host, respectively, where the first or second scaling factor is based at least in part on: a number of services running on the respective host, a functionality of the respective host, and a use case of the respective host; calculate a first criticality score of the first host based on the first type information and the first scaling factor; calculate a second criticality score of the second host based on the second type information and the second scaling factor; and facilitate to apply a security patch on the first host prior to the second host when the first criticality score is higher than the second criticality score.

In some aspects, the techniques described herein relate to a system, where the first or second device category is one of workstation, router, server, printer, camera or a combination thereof.

In some aspects, the techniques described herein relate to a system, where the first or second type information include a criticality range with a minimum and maximum value for each device category.

In some aspects, the techniques described herein relate to a system, where the first criticality score is a product of multiplying the first type information and the first scaling factor, and the second criticality score is a product of multiplying the second type information and the second scaling factor.

In some aspects, the techniques described herein relate to a system, where calculating the first or second criticality score includes using, as a multiplication factor, the minimum value for the device category of the first or second type information.

In some aspects, the techniques described herein relate to a system, where the functionality of the first or second host is identified based on a network map.

In some aspects, the techniques described herein relate to a system, where the functionality of the first or second host is inferred by network traffic and interactions.

In some aspects, the techniques described herein relate to a system, where the use case of the first or second host is determined by a location of the respective host.

In some aspects, the techniques described herein relate to a system, including: one or more processors; and a memory in communication with the one or more processors and storing instructions that, when executed by the one or more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score of the first host by multiplying the first type information and the first scaling factor; calculate a second criticality score of the second host by multiplying the second type information and the second scaling factor; and facilitate to apply a security patch on the first host prior to the second host when the first criticality score is higher than the second criticality score.

In some aspects, the techniques described herein relate to a system, where the first or second device category is one of workstation, router, server, printer, camera or a combination thereof.

In some aspects, the techniques described herein relate to a system, where the first or second type information include a criticality range with a minimum and maximum value for each device category; and the calculating the first or second criticality score includes using, as a multiplication factor, the minimum value for the device category of the first or second type information.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 5 shows a table displaying various host type related information, such as host type confidence, host criticality score and host risk score, that the presently disclosed network characterization and management system may utilize to prioritize patch management and/or proactively improve cyber defense posture.

FIG. 6 is a flowchart illustrating an exemplary computer network management process in accordance with one or more embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure describes various aspects of various embodiments of network characterization and management systems based on key terrain identification.

Figure 1:
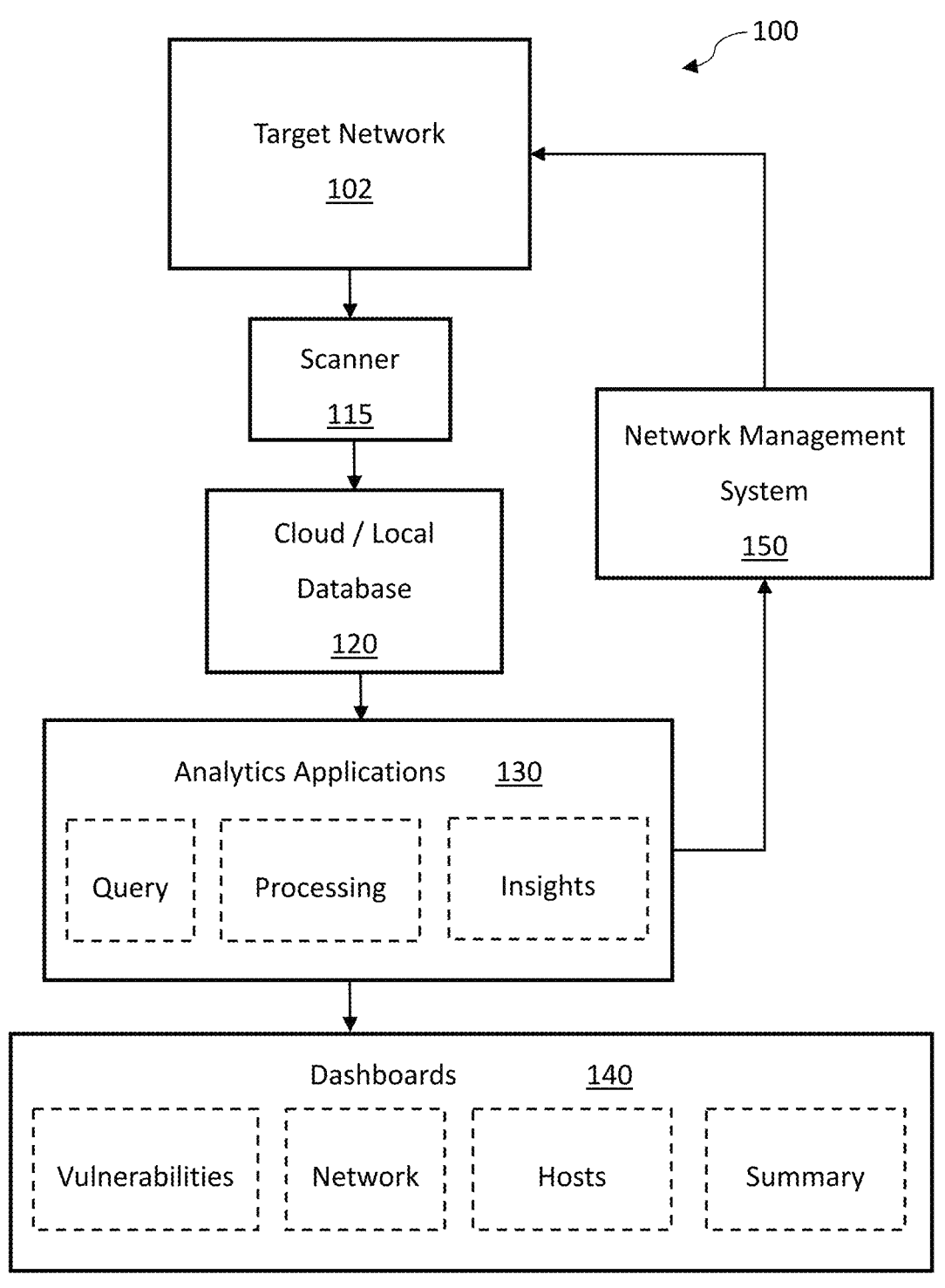
FIG. 1 is a block diagram of an exemplary network characterization and management system 100 for securing a computer network in accordance with one or more embodiments of the present disclosure.

FIG. 1 is a block diagram of an exemplary network characterization and management system 100 for securing a computer network in accordance with one or more embodiments of the present disclosure. The network characterization and management system 100 includes at least one scanner 115, at least one cloud and/or local database 120, at least one analytics application 130, at least one dashboard 140 and a network management system 150 for securing a target network 102.

In some embodiments, the scanner 115 runs on the target network 102 from a scanner host to explore and gather information about devices on the target network 102. For example, the scanner 115 scans the target network 102 and identifies media access control (MAC) addresses associated with all the devices connected therein. The scanner 115 can also identify active Internet protocol (IP) addresses within a given range or subnet and determine availability of hosts or devices on the target network 102. Scans may include, but are not limited to, host discovery and vulnerability scans.

The term "host," as used herein, refers generally to any device on the network and may include but is not limited to workstations, routers, servers, printers, or cameras. If a device interacts with other network components and/or performs at least one network operation, the device qualifies as a host.

In some embodiments, the scan results may be pushed to database 120 for retrieval. The database 120 may be cloud-based, local to the scanner 115, or both. By pushing the scan results to the database 120, the network characterization and management system 100 can assess and monitor network vulnerabilities, maintain an asset inventory, detect changes in the target network 102, and centralize reporting and analysis.

For vulnerability assessment and monitoring, pushing scan results to the database 120 allows organizations to maintain a historical record of security assessments. This enables organizations to track changes over time, compare results, and ensure compliance with security policies.

For asset inventory and tracking, network scans reveal information about devices, services, and software running on the target network 102. Pushing this data to the database 120 allows organizations to create an inventory of network assets. Pushing data to the database 120 helps answer questions like: "What devices are connected?", "Which software versions are in use?", and "Are there unauthorized or unpatched systems?".

Regular network scans enables change detection for the network environment. By storing scan results in the database 120, organizations can track modifications such as: new devices added; software installations or updates; and configuration changes. Such regular network scans aid in incident response and forensics.

For centralized reporting and analysis, the database 120 provides a centralized repository for scan results. Security teams can generate reports, visualize trends, and analyze patterns. Such centralized reporting and analysis facilitate decision-making, risk assessment, and resource allocation.

In general, pushing scan results to the database 120 may be like having a well-organized library of network insights.

In some embodiments, the analytics applications 130 query the database 120 to retrieve scan results, process scan results, and present insights derived from data to end users. The analytics applications 130 collect, process and analyze network data to improve various aspects of the network. The present disclosure describes a system and method to automate analytics applications, thus eliminating the need for manual troubleshooting and complex tasks performed by information technology (IT) staff members.

In some embodiments, the analytics applications 130 extract intelligence from data collected from diverse sources: network devices (such as switches, routers, and wireless access points), servers (including syslog, DHCP, AAA, and configuration databases), and traffic-flow details (such as wireless congestion, data speeds, and latency). The extracted intelligence may be displayed in the analytics applications 130 and provide insights of the target network 102 that include, but are not limited to, identifying performance bottlenecks, evaluating the health of network devices, recommending adjustments to enhance performance, analyzing traffic to and from endpoints to build profiles, detecting anomalies (even in encrypted traffic) that may indicate compromised endpoints, and/or any combination thereof.

As shown in FIG. 1, the insights generated by analytics application 130 may be provided to both the dashboards 140 and the network management system 150. In some embodiments, the dashboards 140 display information about vulnerabilities present on the target network 102, hosts on the network, and an overall summary of the network.

In some embodiments, the network management system 150 may be an application or set of applications that enables network administrators to manage various components within the target network. The network management system 150 provides a unified platform for configuring, monitoring and optimizing network performance. In one or more embodiments, the network management system 150 allows administrators to set up and adjust network devices (such as switches, routers, and access points) according to specific requirements. The network management system 150 collects real-time data from network elements and endpoint devices (e.g., mobile phones, laptops). This data helps proactively identify performance issues, monitor security, and segment the network. The network management system 150 improves information technology and network monitoring (including debugging, security, etc.) by accelerating problem resolution by providing insights into network health and performance. The network management system 150 assists in monitoring security events, detecting anomalies, and ensuring compliance with security policies.

The present disclosure describes an automated key terrain identification process that may be included as a component in the analytics applications 130. The term "key terrain" as used herein, can generally refer to specific hosts deemed to be critical to the overall operation of a network. Additionally, "host criticality" may be defined as how critical a given host is in reference to the overall operation of a network, and the quantitative Host Criticality Score (HCS) described herein may generally be used to automatically identify "key terrain".

The HCS may have a value in a predetermined range (e.g., between 1 and 100) that quantifies host criticality with respect to a number of components including but not limited to:

Host Type representing the role, function or classification of each host

Number of services running on each host

Business Use/Mission Criticality

Inferred/Mapped Functionality

The term, "inferred functionality" as described herein generally refers to the process of using computational methods to deduce the role a host plays within a network based on observed characteristics of that host. The challenge in network inference lies in the high uncertainty and the potential for false positives and negatives. Validating such inferences require robust methods, and researchers often rely on assortativity coefficients or other metrics to compare different inference algorithms.

The term, "mapped functionality" as described herein generally refers to using human-curated mappings from host(s) to function(s) that the host(s) support on the network.

The equation below may be an exemplary formula for calculating HCS:

$$HCS = HCS_{min}(T) \times SF_T(X)$$

Eq. 1 where,

T: Host Type (e.g., server, router, workstation)

X: Host Features (vector)

$HCS_{min}(T)$: Minimum HCS for a given host type T $SF_T(X)$: Scaling function for a given host type T Hosts of a given type (referred to as "host type" herein) generally perform specific functions in support of network operations irrespective of what may be taking place on a network. For example, a router handles traffic between a large number of hosts, enabling those hosts to perform host-specific operations; and a printer can often only accept requests from a limited number of hosts (e.g., workstations near the physical location of the printer). Therefore, a router may be more critical than a printer to the network operations. Allowed ranges for host criticality scores for each unique host type T may be defined based on this assumption.

For a given host type T, HCS may vary between a defined minimum and maximum value to reflect their expected relative importance. These values may be determined empirically or set manually by the user. For example, the user may decide that the allowed ranges per host type are:

Server: varies from 75 to 100

Router: varies from 50 to 100

Workstation: varies from 33 to 65

Embedded: varies from 33 to 65

Printer: varies from 1 to 40

In Eq. 1 for HCS:

$HCS_{min}(T)$: minimum HCS for a given host type T (e.g., 75 for servers in the above example).

A scaling function, $SF_T(X)$, may be defined for each host type T. The scaling functions encode variability in criticality for each host type T as a function of descriptive features, X.

An exemplary set of constraints on the form of $SF_T(X)$ are as follows:

The range of $SF_T(X)$ may be determined by minimum/maximum allowed HCS for host type T. For example, the range may be:

[1, $\{HCS_{max}(T) - HCS_{min}(T)\}/HCS_{min}(T)]$ if $HCS_{min}(T) \ne 1$.

[1, $HCS_{max}(T)]$ if $HCS_{min}(T) == 1$.

Referring to the previous example:

HCS for servers may vary between 75 [$HCS_{min}(T)$] and 100 [$HCS_{max}(T)$].

The allowed range for the scaling function is: [1, (100−75)/75]=[1, 1.333].

The functional form of $SF_T(X)$ may vary for each T as long as it possesses the following asymptotic behavior:

$SF_T(X) = 1$ if no descriptive features available (X may be null)

$SF_T(X)$ asymptotes at the maximum value in range

Bounds HCS to the desired range (1 to 100).

Implies that there may be a point at which HCS should be maxed out even if other amplifying information may be taken into account.

$SF_T(X)$ may be defined as the product of component-specific scaling functions.

For example, if information on the number of services, mission criticality, and inferred functionality is available:

$$X=\{\text{Features for Services, Business Use/Mission Criticality, Inferred Functionality}\}$$

$$SF_T(X)=SF_{T;SERVICES}((X)\times SF_{T;CRITICALITY}(X)\times SF_{T;FUNCTIONALITY}(X)$$

Component-specific scaling functions are defined such that the overall scaling function, $SF_T(X)$, may be unaffected if features for a given component are not available.

For example, the number of services known to be running on a host may be taken as input to the scaling function for a given host type T. The motivation for this component may be that more services is likely (positively) correlated with the exemplar definition of host criticality.

The functional forms of $SF_{T;}$ SERVICES(X) may be set by the user or determined empirically.

Functional families include but are not limited to:

Uniform

Linear

Power (decimal root)

Exponential

To determine the appropriate functional form for the scaling function empirically given a large network with many hosts, one might:

Calculate the number of services running on each host

Construct a probability distribution function (PDF) (histogram) of the number of services for all hosts Use the form of the PDF to inform the functional family:

Single-Valued PDF→Uniform $SF_{T;\ SERVICES}(X)$

Uniform PDF→Linear $SF_{T;\ SERVICES}(X)$

Skewed Left→Power $SF_{T;\ SERVICES}(X)$

The nature of the work being conducted on a given host may be another dimension of host criticality. In commercial settings, for example, business use and/or department (e.g., HR, Sales, IT) may influence host criticality.

As another example, in a setting where networks support military operations, specific missions may be mapped to host criticality (as a function of what operations and/or initiatives the missions support).

The functional forms of $SF_T$; CRITICALITY(X) may be set by the user or determined empirically and must be determined by the nature of the data available.

Software installed or running on a given host can provide another quantifiable component of criticality. For example, consider a database server and an authentication server:

The database server runs software (e.g., Microsoft SQL Server) indicating it may be used to host a database that may be used by other hosts on the network.

The authentication server runs software (e.g., Microsoft Active Directory) used to ensure secure connections may be made between hosts on the network.

Even if both servers are managed by the same department (e.g., IT), the software running on each host may be a clear signature of a particular type of functionality, and in turn, that inferred functionality correlates with host criticality.

Quantifying how this component contributes to host criticality, and more directly, $SF_T$; FUNCTIONALITY(X), may include:

Defining a class of functionalities (e.g., database server, authentication server)

Building a map from instances of software to functionalities

Quantifying how each functionality contributes to criticality

Defining the functional form of the scaling function that accepts those values as input While it is possible to calculate host criticality in an automated fashion using the proposed method, users may also wish to provide their own measures of criticality to influence the final host criticality score.

Consider, for example, two database servers running on different hosts with (1) exactly the same services and (2) managed by the same department:

DB Server #1: Manages critical data for a hosted application

DB Server #2: Manages account information for users with access to a hosted application If DB Server #1 goes down and the data stored on the server has not been replicated, the hosted application may be no longer functional.

If DB Server #2 goes down, user accounts will need to be recreated, but the critical data will not be lost, and the hosted application will still be functional.

If there is no other information to differentiate between DB Servers #1 and #2, the user-provided information about the nature of the databases hosted on each server may be used to "break the tie" in HCS.

Host criticality scores may be used to automatically identify "key terrain" (i.e., critical hosts) on a network. Example uses of host criticality scores include:

Patch managers prioritize vulnerabilities that may be exploitable on critical hosts irrespective of the CVSS score.

Network administrators overlay host risk scores and transfer critical operations away from hosts with high host risk score AND host criticality score.

If host criticality scores are generated for a sensitive network that supports military operations, defensive cyber analysts look at how bad actors may gain access to/move about the network if they were to target "key terrain" (may also inform sensor placement, firewalls to proactively improve defensive posture).

FIGS. 2-5 show exemplary elements of dashboard 140 that displays information about vulnerabilities present on a target network, hosts on the network, and an overall summary of the network.

Figure 2:
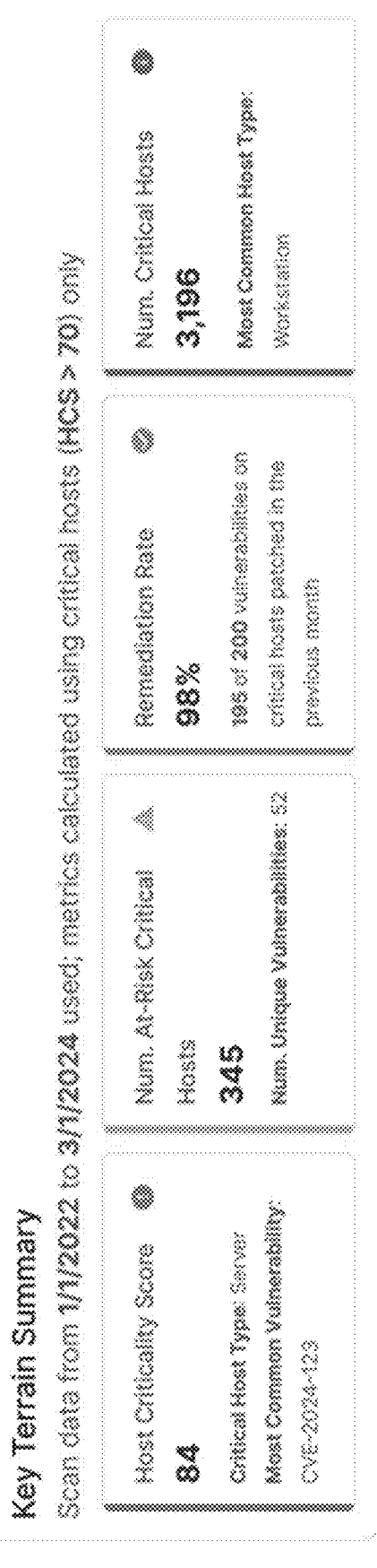
FIG. 2 shows a dashboard element that contains metrics calculated for "key terrain" over a period of time.

FIG. 2 shows a dashboard element that contains metrics calculated for "key terrain" over a period of time. The metrics include host criticality score, number of at-risk critical hosts, remediation rate, and number of critical hosts. Users of the presently disclosed network characterization and management system may review results of the automated key terrain identification in the dashboard to rapidly identify and rectify vulnerabilities present on critical hosts.

Figure 3:
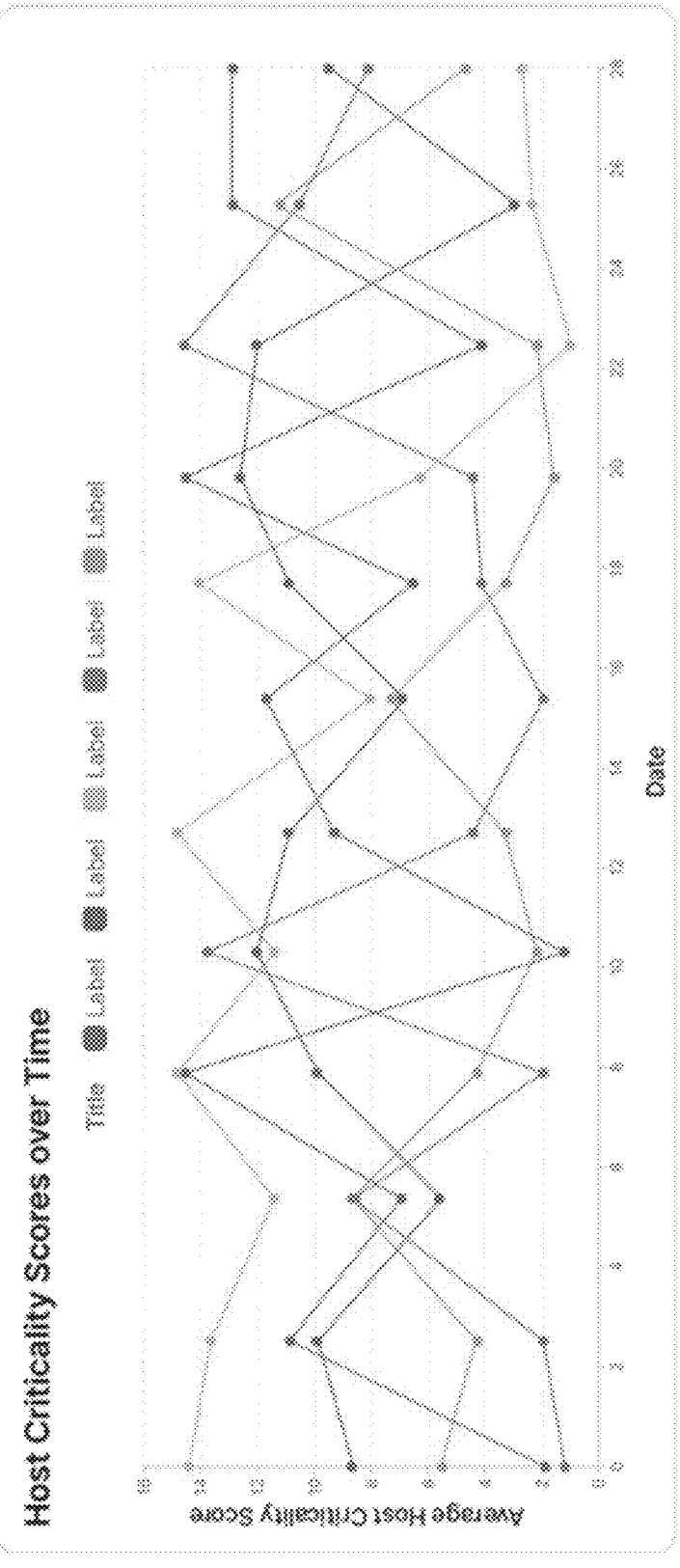
FIG. 3 is a line chart displaying a host criticality score over time for selected host types (e.g., workstation, server, router).

FIG. 3 is a line chart displaying a host criticality score over time for selected host types (e.g., workstation, server, router). Data used to determine host criticality scores may be embedded in the line chart (available by clicking on points) or in another dashboard element.

Figure 4:
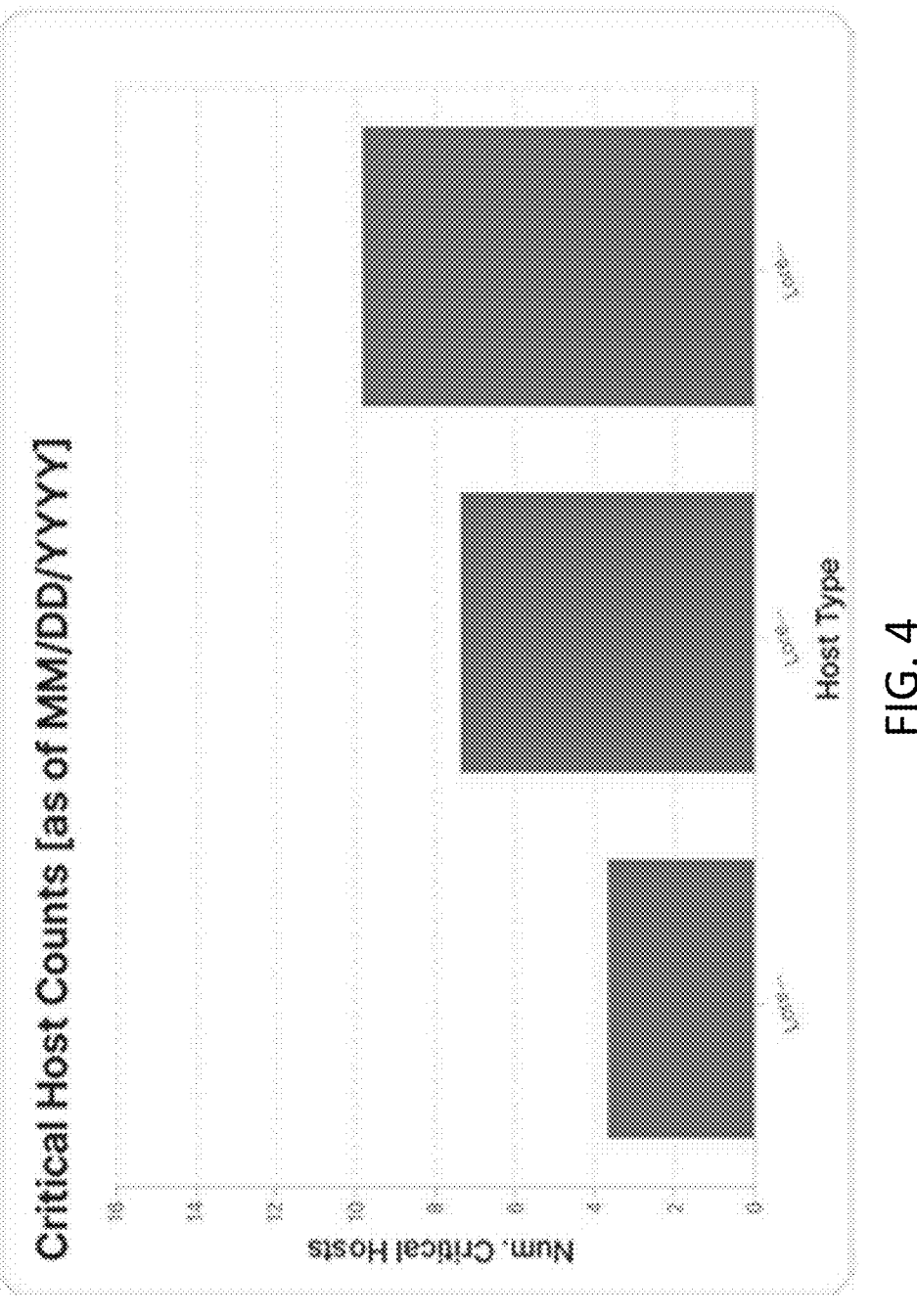
FIG. 4 shows a bar chart displaying the number of critical hosts vs. host types.

FIG. 4 shows a bar chart displaying the number of critical hosts vs. host types.

FIG. 5 shows a table displaying various host type related information, such as host type confidence, host criticality score and host risk score, that the presently disclosed network characterization and management system may utilize to prioritize patch management and/or proactively improve cyber defense posture.

In some embodiments, a computer-implemented method includes obtaining, by a computing device, a criticality score for each of a first and second host in a computer network, where obtaining the criticality score including: scanning, by the computing device, a host in a network to obtain type information of the host, a number of services running on the host, a functionality of the host, and a use case of the host; running, by the computing device, a machine learning model on the type information of the host to extract a minimum host criticality score; determining, by the computing device, a scaling factor based on the number of services running on the host, the functionality of the host, and the use case of the host; and calculating, by the computing device, the critical-ity score of by applying the scaling factor to the minimum host criticality score; and applying, by the computing device, a security patch on the first host prior to the second host when the criticality score of the first host may be higher than the criticality score of the second host.

In some embodiments, the criticality score may be obtained repeatedly over time from the network to monitor changes to network operation.

FIG. 6 is a flowchart illustrating an exemplary computer network management process 700 in accordance with one or more embodiments of the present disclosure. The steps shown in FIG. 6 can be performed by any suitable computer-executable code and/or computing system, including system 100 shown in FIG. 1, and/or variations or combinations of one or more of the same. In one example, each of the steps shown in FIG. 6 can represent an algorithm whose structure includes and/or is represented by multiple sub-steps, examples of which will be provided in greater detail below.

In step 610, a computing device scans a network having at least a first and second host.

In step 620, the computing device obtains, via the scan-ning, a first and second type information of the first and second host, respectively. In some embodiments, the first or second type information includes a device category the first or second host belongs to. In some embodiments, the device category is one of workstation, router, server, printer, camera or a combination thereof.

In step 630, the computing device obtains, via the scan-ning, a first and second scaling factor of the first and second host, respectively. In some embodiments, the first or second scaling factor is determined by a number of services running on the respective host, a functionality of the respective host, and a use case of the respective host.

In step 640, the computing device calculates a first criticality score of the first host based on the first type information and the first scaling factor. In some embodi-ments, the first criticality score is a product of multiplying the first type information and the first scaling factor. In some embodiments, calculating the first criticality score involves using, as a multiplication factor, a minimum value for the device category of the first type information.

In step 650, the computing device calculates a second criticality score of the second host based on the second type information and the second scaling factor. In some embodi-ments, the second criticality score is a product of multiply-ing the second type information and the second scaling factor. In some embodiments, calculating the second criti-cality score involves using, as a multiplication factor, a minimum value for the device category of the second type information.

In step 660, the computing device facilitates to apply a security patch on the first host prior to the second host when the first criticality score is higher than the second criticality score.

In some embodiments, the process 600 repeats steps 610 through 660 at a predetermined frequency.

In some embodiments, the computing device displays the criticality scores in a time chart, so that the network security situation can be observed in real time.

Figure 7:
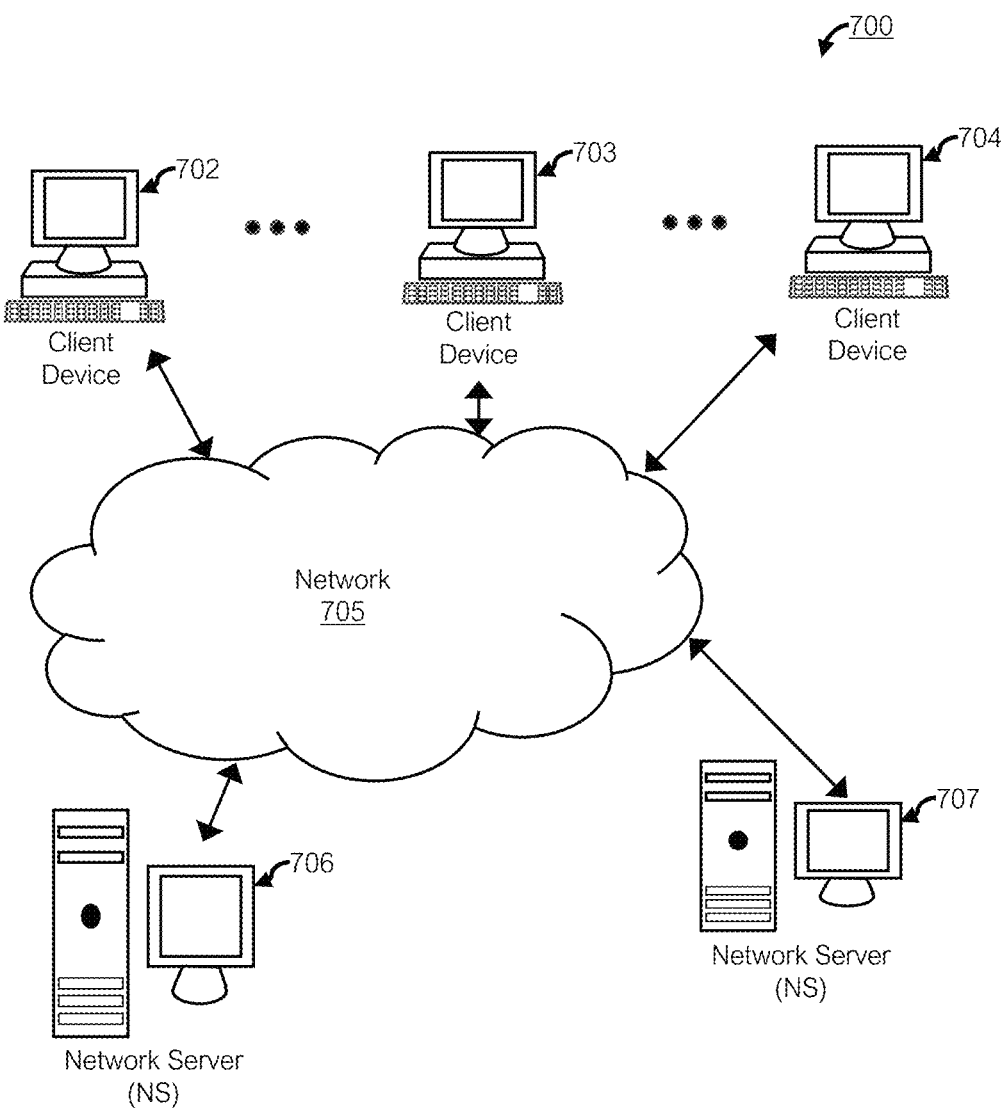
FIG. 7 depicts a block diagram of an exemplary computer-based system and platform in accordance with one or more embodiments of the present disclosure.

FIG. 7 depicts a block diagram of an exemplary com-puter-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing compo-nents of the exemplary computer-based system and platform 700 may be configured to generate a plurality of unique identification codes for the plurality of devices, compare the plurality of unique identification codes, and calculate a similarity score based on the comparison of the plurality of unique identification codes, as detailed herein. In some embodiments, the exemplary computer-based system and platform 700 may be based on a scalable computer and network architecture that incorporates various strategies for assessing the data, caching, searching, and/or database con-nection pooling. An example of the scalable architecture is an architecture that is capable of operating multiple servers.

In some embodiments, referring to FIG. 7, client device 702, client device 703 through client device 704 (e.g., clients) of the exemplary computer-based system and plat-form 700 may include virtually any computing device capable of receiving and sending a message over a network (e.g., cloud network), such as network 705, to and from another computing device, such as servers 706 and 707, each other, and the like. In some embodiments, the client devices 702 through 704 may be personal computers, multiprocessor systems, microprocessor-based or programmable consumer electronics, network PCs, and the like. In some embodi-ments, one or more client devices within client devices 702 through 704 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 702 through 704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodi-ments, one or more client devices within client devices 702 through 704 may run one or more applications, such as Internet browsers, mobile applications, voice calls, video games, videoconferencing, and email, among others. In some embodiments, one or more client devices within client devices 702 through 704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 702 through 704 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advanced user, standard user. In some embodiments, one or more client devices within client devices 702 through 704 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 705 may also include mass storage, such as network attached storage (NAS), a storage area network (SAN), a content delivery network (CDN) or other forms of computer or machine-readable media.

In some embodiments, the exemplary server 706 or the exemplary server 707 may be a web server (or a series of servers) running a network operating system, examples of which may include but are not limited to Apache on Linux or Microsoft IIS (Internet Information Services). In some embodiments, the exemplary server 706 or the exemplary server 707 may be used for and/or provide cloud and/or network computing. Although not shown in FIG. 7, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 701 through 704.

In some embodiments and, optionally, in combination of any embodiment described above or below, for example, one or more exemplary computing client devices 702 through 704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 8:
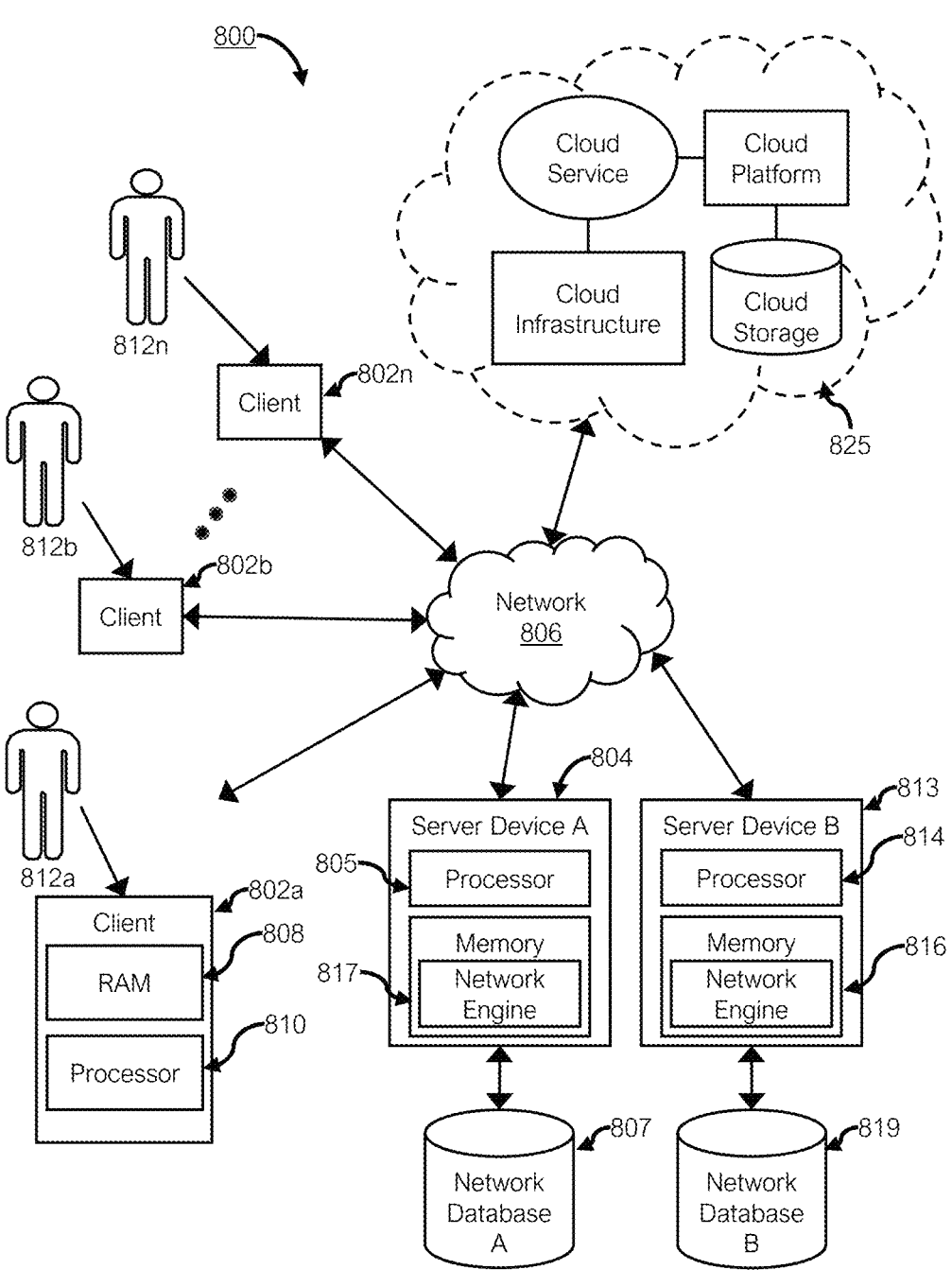
FIG. 8 depicts a block diagram of another exemplary computer-based system and platform 900 in accordance with one or more embodiments of the present disclosure.

FIG. 8 depicts a block diagram of another exemplary computer-based system and platform 800 in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the client device 802a, client device 802b through client device 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client device 802*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, client devices 802*a* through 802*n* may also include a number of external or internal devices such as a mouse, a CD-ROM, DVD, a physical or virtual keyboard, a display, or other input or output devices. In some embodiments, examples of client devices 802*a* through 802*n* (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, client devices 802*a* through 802*n* may be specifically programmed with one or more application programs in accordance with one or more principles/methodologies detailed herein. In some embodiments, client devices 802*a* through 802*n* may operate on any operating system capable of supporting a browser or browser-enabled application, such as Microsoft™, Windows™, and/or Linux. In some embodiments, client devices 802*a* through 802*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802*a* through 802*n*, user 812*a*, user 812*b* through user 812*n*, may communicate over the exemplary network 806 with each other and/or with other systems and/or devices coupled to the network 806. As shown in FIG. 8, exemplary server devices 804 and 813 may include processor 805 and processor 814, respectively, as well as memory 817 and memory 816, respectively. In some embodiments, the server devices 804 and 813 may be also coupled to the network 806. In some embodiments, one or more client devices 802*a* through 802*n* may be mobile clients.

In some embodiments, at least one database of exemplary databases 807 and 815 may be any type of database, including a database managed by a database management system (DBMS). In some embodiments, an exemplary trained autoencoder 122 may be specifically programmed as an engine that controls organization, storage, management, and/or retrieval of data in the respective database. In some embodiments, the exemplary trained autoencoder 122 may be specifically programmed to provide the ability to generate a plurality of unique identification codes for the plurality of devices, compare the plurality of unique identification codes, and calculate a similarity score based on the comparison of the plurality of unique identification codes. In some embodiments, the exemplary trained autoencoder may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary trained autoencoder of the present disclosure may be specifically configured to operate in a cloud computing/architecture 825 such as, but not limiting to: infrastructure a service (IaaS), platform as a service (PaaS), and/or software as a service (SaaS) using a web browser, mobile app, thin client, terminal emulator, or other endpoints.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/ or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000, 000 (e.g., but not limited to, 1,000,000,000-999,999,999, 999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

At least some aspects of the present disclosure will now be described with reference to the following numbered clauses.

Clause 1. A computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score of the first host based on the first type information and the first scaling factor; calculating, by the computing device, a second criticality score of the second host based on the second type information and the second scaling factor; and facilitating, by the computing device, to apply a security patch on the first host prior to the second host when the first criticality score is higher than the second criticality score.

Clause 2. The method of clause 1, where the first or second device category is one of workstation, router, server, printer, camera or a combination thereof.

Clause 3. The method of clause 1, where the first or second type information include a criticality range with a minimum and maximum value for each device category.

Clause 4. The method of clause 3, where the minimum value for the device category of the first or second host is determined by a machine learning model.

Clause 5. The method of clause 3, where the first criticality score is a product of multiplying the first type information and the first scaling factor, and the second criticality score is a product of multiplying the second type information and the second scaling factor.

Clause 6. The method of clause 5, where calculating the first or second criticality score includes using, as a multiplication factor, the minimum value for the device category of the first or second type information.

Clause 7. The method of clause 1, where the functionality of the first or second host is identified based on a network map.

Clause 8. The method of clause 1, where the functionality of the first or second host is inferred by network traffic and interactions.

Clause 9. The method of clause 1, where the use case of the first or second host is determined by a location of the respective host.

Clause 10. The method of clause 1, where the network scanning and calculating the criticality scores are conducted repeatedly at a predetermined frequency.

Clause 11. A computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score of the first host by multiplying the first type information and the first scaling factor; calculating, by the computing device, a second criticality score of the second host by multiplying the second type information and the second scaling factor; and facilitating, by the computing device, to apply a security patch on the first host prior to the second host when the first criticality score is higher than the second criticality score.

Clause 12. The method of clause 11, where the first or second device category is one of workstation, router, server, printer, camera or a combination thereof.

Clause 13. The method of clause 11, where the first or second type information include a criticality range with a minimum and maximum value for each device category.

Clause 14. The method of clause 13, where the minimum value for the device category of the first or second host is determined by a machine learning model.

Clause 15. The method of clause 13, where calculating the first or second criticality score includes using, as a multiplication factor, the minimum value for the device category of the first or second type information.

Clause 16. The method of clause 11, where the functionality of the first or second host is identified based on a network map.

Clause 17. The method of clause 11, where the functionality of the first or second host is inferred by network traffic and interactions.

Clause 18. The method of clause 11, where the use case of the first or second host is determined by a location of the first or second host.

Clause 19. The method of clause 11, where the network scanning and calculating the criticality scores are conducted repeatedly at a predetermined frequency.

Clause 20. A system, including: one or more processors; and a memory in communication with the one or more processors and storing instructions that, when executed by the one or more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first and second scaling factor of the first and second host, respectively, where the first or second scaling factor is based at least in part on: a number of services running on the respective host, a functionality of the respective host, and a use case of the respective host; calculate a first criticality score of the first host based on the first type information and the first scaling factor; calculate a second criticality score of the second host based on the second type information and the second scaling factor; and facilitate to apply a security patch on the first host prior to the second host when the first criticality score is higher than the second criticality score.

Clause 21. The system of clause 20, where the first or second device category is one of workstation, router, server, printer, camera or a combination thereof.

Clause 22. The system of clause 20, where the first or second type information include a criticality range with a minimum and maximum value for each device category.

Clause 23. The system of clause 22, where the first criticality score is a product of multiplying the first type information and the first scaling factor, and the second criticality score is a product of multiplying the second type information and the second scaling factor.

Clause 24. The system of clause 23, where calculating the first or second criticality score includes using, as a multiplication factor, the minimum value for the device category of the first or second type information.

Clause 25. The system of clause 20, where the functionality of the first or second host is identified based on a network map.

Clause 26. The system of clause 20, where the functionality of the first or second host is inferred by network traffic and interactions.

Clause 27. The system of clause 20, where the use case of the first or second host is determined by a location of the respective host.

Clause 28. A system, including: one or more processors; and a memory in communication with the one or more processors and storing instructions that, when executed by the one or more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score of the first host by multiplying the first type information and the first scaling factor; calculate a second criticality score of the second host by multiplying the second type information and the second scaling factor; and facilitate to apply a security patch on the first host prior to the second host when the first criticality score is higher than the second criticality score.

Clause 29. The system of clause 28, where the first or second device category is one of workstation, router, server, printer, camera or a combination thereof.

Clause 30. The system of clause 28, where the first or second type information include a criticality range with a minimum and maximum value for each device category; and the calculating the first or second criticality score includes using, as a multiplication factor, the minimum value for the device category of the first or second type information.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A computer-implemented method comprising:
obtaining, by a computing device, a first parameter of a first device, and a second parameter of a second device, the first or second parameter comprising a device category of the respective first or second device;
obtaining, by the computing device, a first scaling factor of the first device, and a second scaling factor of the second device, wherein the first scaling factor or the second scaling factor is a product of a first component-specific scaling function associated with a number of services running on a respective device out of the first device or the second device, a second component-specific scaling function associated with a functionality of the respective device, and a third component-specific scaling function associated with a use case of the respective device;
calculating, by the computing device, a first criticality score of the first device based at least on the first parameter and the first scaling factor;
calculating, by the computing device, a second criticality score of the second device based on the second parameter and the second scaling factor;
wherein calculating the first or the second criticality score comprises:
using, as a multiplication factor, a minimum value for the respective device category of the first or second device; and
facilitating, by the computing device, to apply a security patch on the first device prior to the second device when the first criticality score is higher than the second criticality score.

2. The method of claim 1, wherein the device category is selected from workstation, router, server, printer, camera or a combination thereof.

3. The method of claim 1, wherein the minimum value for the device category of the first or the second parameter is determined by a machine learning model.

4. The method of claim 1, wherein the first criticality score is a product of multiplying the first parameter and the first scaling factor, and the second criticality score is a product of multiplying the second parameter and the second scaling factor.

5. The method of claim 1, wherein the functionality of the first or second device is identified based on a network map.

6. The method of claim 1, wherein the functionality of the first or second device is inferred by network traffic and interactions.

7. The method of claim 1, wherein a use case of the first or second device is determined by a location of the respective device.

8. The method of claim 1, further comprising repeatedly scanning at a predetermined frequency, by the computing device, a computer network hosting the first and the second device to obtain the first and the second parameter for calculating the first and the second criticality score.

9. A computer-implemented method comprising:
scanning, by a computing device, a network having at least a first and a second device;
obtaining, by the computing device via the scanning, a first parameter of the first device, and second parameter of the second device, the first or second parameter comprising a device category of the respective first or second device;
obtaining, by the computing device via the scanning, a first scaling factor of the first device, and a second scaling factor of the second device, wherein the first scaling factor or the second scaling factor is a product of a first component-specific scaling function associated with a number of services running on a respective device out of the first device or the second device, a second component-specific scaling function associated with a functionality of the respective device, and a third component-specific scaling function associated with a use case of the respective device;
calculating, by the computing device, a first criticality score of the first device by multiplying the first parameter and the first scaling factor;
calculating, by the computing device, a second criticality score of the second device by multiplying the second parameter and the second scaling factor;
wherein calculating the first or the second criticality score comprises:
using, as a multiplication factor, a minimum value for the respective device category of the first or second device; and
facilitating, by the computing device, to apply a security patch on the first device prior to the second device when the first criticality score is higher than the second criticality score.

10. The method of claim 9, wherein the device category is selected from workstation, router, server, printer, camera or a combination thereof.

11. The method of claim 9, wherein the minimum value for the device category of the first or second parameter is determined by a machine learning model.

12. The method of claim 9, wherein the functionality of the first or second device is identified based on a network map or inferred by network traffic and interactions.

13. The method of claim 9, wherein the use case of the first or second device is determined by a location of the first or second device.

14. The method of claim 9, wherein the network scanning and calculating the criticality scores are conducted repeatedly at a predetermined frequency.

15. A system, comprising:
one or more processors; and
a memory in communication with the one or more processors and storing instructions that, when executed by the one or more processors, cause the one or more processors to:
obtain a first parameter of a first device, and a second parameter of a second device, the first or second parameter comprising a device category of the respective first or second device;
obtain a first and a second scaling factor of the first and the second device, respectively, wherein the first scaling factor or the second scaling factor is a product of a first component-specific scaling function associated with a number of services running on a respective device out of the first device or the second device, a second component-specific scaling function associated with a functionality of the respective device, and a third component-specific scaling function associated with a use case of the respective device;
calculate a first criticality score of the first device based at least on the first parameter and the first scaling factor;
calculate a second criticality score of the second device based at least on the second parameter and the second scaling factor;
wherein calculating the first or the second criticality score comprises:
using, as a multiplication factor, a minimum value for the respective device category of the first or second device; and
facilitate to apply a security patch on the first device prior to the second device when the first criticality score is higher than the second criticality score.

16. The system of claim 15, wherein the device category is selected from workstation, router, server, printer, camera or a combination thereof.

17. The system of claim 15, wherein the minimum value for the device category of the first or second parameter is determined by a machine learning model.

18. The system of claim 15, wherein the functionality of the first or the second device is identified based on a network map or inferred by network traffic and interactions.

* * * * *